...

UNITED STATES PATENT OFFICE 2,589,978

LYSERGYL AND ISOLYSERGYL GLYCINES

Arthur Stoll, Albert Hofmann, Ernst Jucker, Theodor Petrzilka, Jürg Rutschmann, and Franz Troxler, Basel, Switzerland, assignors to Sandoz Limited, Basel, Switzerland, a Swiss firm No Drawing. Application December 13, 1948, Serial No. 65,062. In Switzerland September 17, 1948

6 Claims. (Cl. 260—285.5)

The present invention relates to new compounds of the type of ergot alkaloids and to a process for their manufacture.

The natural alkaloids of ergot may be divided into two structural groups, one comprising five pairs of alkaloids with a peptide-like structure and the other consisting of alkaloids of a simpler type. The former are derived from lysergic acid or iso-lysergic acid by combination with various amino acids, and the latter from lysergic acid or isolysergic acid by union through an amide linkage with an amino alcohol. Only a single pair of representatives of the latter class of alkaloids has so far been isolated from the natural drug. A classification of the natural ergot alkaloids according to their constitution has been made by A. Stoll, A. Hofmann, and B. Becker, Helv. Chim. Acta, 26, 1602 (1943).

In previous patents, a process was described according to which it is possible to synthesize from their components alkaloids of this simpler, so-called ergobasine type such as the natural ergobasine (d-lysergic acid-1 (+)-isopropanolamide) and the isomeric ergobasinine (d-isolysergic acid-1 (+)-isopropanolamide) (cf. U. S. Patent No. 2,090,430).

A process has now been found which also enables alkaloids of the more complicated, peptide-like type to be synthesized. According to this process, the azide of lysergic acid, iso-lysergic acid, dihydro-lysergic acid, dihydro-isolysergic acid(I) or dihydro-lysergic acid(II) is allowed to react either in the cold, at room temperature or at a slightly raised temperature with glycine (free or substituted), glycinamide or a glycine ester. In this way, the carboxyl group of the lysergic acid or iso-lysergic acid is coupled with the amino group of the glycine with the release of hydrazoic acid.

The yield of the peptide-like condensation product may be improved if, in order to neutralize the hydrazoic acid being formed during the reaction, more than one mole of amino compound (up to 2 moles) is used for each mole of azide, or if, during the reaction between equimolecular quantities of azide and amino compound, the reaction solution is shaken with solid potassium carbonate.

Lysergic acid, iso-lysergic acid, dihydro-lysergic acid, dihydro-lysergic acid(I) and dihydro-lysergic acid(II) or their azides are obtainable both in the natural configuration, known as the d-form, and in the form of their enantiomers which do not occur in nature, i. e. l-lysergic acid, l-isolysergic acid, dihydro-l-lysergic acid, dihydro-l-isolysergic acid(I) and dihydro-l-isolysergic acid(II), or their azides (cf. U. S. Patent No. 2,447,214 and British Patent No. 573,514) and A. Stoll and A. Hofmann, Helv. Chim. Acta 26, 922 (1943). From the latter, the corresponding peptide-like derivatives with l-configuration may be prepared. The examples which are given below relate only to derivatives with the d-configuration; the l-forms behave in exactly the same manner when subjected to the process herein described.

The new synthetic glycine derivatives of the said lysergic acids and iso-lysergic acids peptides are, like the natural ergot alkaloids, mutually interconvertible. They also give the color reactions which are characteristic for the natural ergot alkaloids, e. g. the color reactions of Keller or Van Urk-Smith.

The new compounds are intended to be used as medicaments or as intermediates for the preparation of medicaments.

*Example 1.—Dihydro-d-lysergyl-glycine ethyl ester*

1.0 g. of dihydro-d-lysergic azide and 0.62 g. of glycine ethyl ester (corresponding to two equivalents with respect to the azide) are ground well together at 40° C. for 10 minutes, then diluted with 1 c. c. of ethyl acetate and allowed to stand for 2½ hours at the same temperature.

The reaction product is decolorized by boiling for a short time with a small quantity of activated charcoal in methylene chloride solution and filtering through a thin layer of talcum. On developing with chloroform, 0.88 g. of dihydro-d-lysergyl glycine ethyl ester is washed into the filtrate. On recrystallization from methylene chloride diluted with ether the compound is obtained in small glistening crystals, M. P. 199–200° C.(Corr.).

Empirical formula $C_{20}H_{25}O_3N_3$:
  Calculated C 67.57  H 7.09  N 11.82%
  Found      C 67.28  H 6.98  N 12.15%

$[\alpha]_D^{20} = -114°$ (c=0.2 in pyridine).

*Example 2.—Dihydro-d-lysergyl-glycyl-l-leucine methyl ester*

1.0 g. of dihydro-d-lysergic azide and 1.0 g. of glycyl-1-leucine methyl ester are mixed together and dissolved in 10 c. c. of methanol. The solution is allowed to stand for three hours at 40° C.

The reaction product is decolorized by boiling it for a short time in acetone with a small quantity of activated charcoal and filtered through a thin layer of talcum. It is then chromatographed using an aluminum oxide column and acetone containing 1% methanol as solvent. In this way, 1.1 g. of dihydro-d-lysergyl glycyl-1-leucine methyl ester are obtained and can be recrystallized from acetone or chloroform diluted with ether. M. P. 120° C. (Corr.).

Empirical formula $C_{25}H_{34}O_4N_4$:
    Calculated  C 66.04  H 7.55  N 12.31%
    Found       C 65.91  H 7.65  N 11.97%

$[a]_D^{20} = -97°$ ($c=0.2$ in pyridine).

Example 3.—Dihydro-d-lysergyl-diglycylglycine methyl ester 1.0 g. of dihydro-d-lysergic azide is mixed with 0.64 g. of diglycylglycine methyl ester, dissolved in a small quantity of methanol, and the larger part of the solvent then removed under reduced pressure. The tenacious mass is kept for two hours at 40° C.

The reaction product is dissolved in a small quantity of methanol and acetone, boiled for a short time with a small quantity of animal charcoal and filtered through a thin layer of aluminum oxide. The filtrate is evaporated under vacuum at 20° C., the residue dissolved in acetone and the solution passed through a column of aluminum oxide. The impurities are first washed out with acetone and the tripeptide then eluated with acetone containing 2% methanol. The dihydro-d-lysergyl-diglycylglycine methyl ester may be re-crystallized from a mixture of methanol and acetone. Yield: 0.75 g. M. P. 208° C. (Corr.).

Empirical formula $C_{23}H_{29}O_5N_5$:
    Calculated      C 60.63  H 6.41  N 15.74%
    Found           C 60.81  H 6.34  N 15.73%
$[a]_D^{20} = -85°$ ($c=0.2$ in pyridine).

Example 4.—d-Lysergyl-glycinamide

A solution of 1.0 g. of d-lysergic azide in 130 c. c. of ether is mixed with a solution of 0.22 g. of glycinamide in 50 c. c. of isopropyl alcohol at 0° C. 10 g. of finely powdered, dry potassium carbonate are added and the mixture shaken for 10 hours at 0° C.

The residue remaining after evaporating the pale yellow filtrate consists of a mixture of d-lysergyl-gylcinamide and d-isolysergyl-glycinamide. It is dissolved in a small quantity of chloroform containing 4% alcohol and the solution allowed to percolate through a column containing 100 g. of aluminum oxide. On developing with the same solvent, the iso-compound (0.3 g.) is washed into the filtrate.

By elution with a mixture of 4 parts of chloroform and 1 part of alcohol, the more strongly adsorbed lysergic acid compound is also extracted. The residue remaining after evaporation (0.6 g.) may be recrystallized by dissolving it in a small quantity of acetone and diluting with benzene. The d-lysergyl glycinamide is obtained in this manner in spherical crystalline clusters, which melt with decomposition at 152° C. The compound is very easily soluble in ethanol and methanol, moderately soluble in acetone and difficultly soluble in chloroform or benzene.

Empirical formula $C_{18}H_{20}O_2N_4$:
    Calculated      C 66.66  H 6.21  N 17.27%
    Found           C 66.25  H 6.05  N 16.85%
$[a]_D^{20} = -6°$ ($c=0.4$ in pyridine).

Example 5.—d-Isolysergyl glycinamide

A solution of 1.0 g. of d-isolysergic azide in 130 c. c. of ether is mixed at 0° C. with a solution of 0.22 g. of glycinamide (corresponding to one equivalent with respect to the azide) in 50 c. c. of isopropyl alcohol. 10 g. of finely powdered, dry potassium carbonate are added and the mixture shaken for 10 hours at 0° C.

The residue remaining after evaporation of the pale yellow filtrate is dissolved in a small quantity of chloroform containing 4% alcohol and the solution passed through a column of 100 g. of aluminum oxide. On developing with the same solvent mixture, the pure iso-compound is washed into the filtrate. Yield 0.9 g.

The d-isolysergyl glycinamide crystallizes from chloroform containing 1–2% alcohol in clusters of needles which melt at 120–130° C. (corr.). The compound is very easily soluble in methanol and alcohol, moderately soluble in chloroform and difficultly soluble in benzene.

Empirical formula $C_{18}H_{20}O_2N_4$:
    Calculated      C 66.66  H 6.21  N 17.27%
    Found           C 66.72  H 6.72  N 17.04%

Example 6.—Dihydro-d-lysergyl glycinamide

To a solution of 1.0 g. of dihydro-d-lysergic azide in 200 c. c. of ether, a solution of 0.33 g. of glycinamide in 60 c. c. of isopropanol is added and the reaction mixture allowed to stand for 15 hours at 0° C. After removal of the solvent under vacuum, the residue is dissolved in a mixture of methanol and chloroform ratio 1:1 and filtered through a short column of aluminum oxide. The residue remaining after filtration can be crystallized by dissolving it in a small quantity of methanol and diluting with acetone. Yield: 0.83 g. of dihydro-d-lysergyl glycinamide. The lustrous needles melt at 220° C. (corr.) and are easily soluble in alcohol, moderately soluble in acetone and difficultly soluble in benzene.

Empirical formula $C_{18}H_{22}O_2N_4$:
    Calculated      C 66.22  H 6.81  N 17.17%
    Found           C 65.86  H 7.19  N 17.12%
$[a]_D^{20} = -123°$ ($c=0.2$ in pyridine).

Example 7.—Dihydro-d-isolysergyl(I) glycinamide

To a solution of 1.0 g. of dihydro-d-isolysergic-(I) azide [7] (prepared according to A. Stoll, A. Hofmann, and Th. Petrzilka, Helv. Chim. Acta 29, 635 (1946) in 150 cc. of ether, a solution of 0.56 g. of glycinamide in 90 cc. of isopropanol is added and the reaction mixture allowed to stand for 24 hours at 20° C. After removal of the solvent under vacuum the residue is extracted twice with 10 cc. of water in order to remove the excess of glycinamide from the dihydro-d-isolysergyl(I) glycinamide, the latter being undissolved. The crude product may be purified by recrystallization from acetone. Yield: 0.85 g. of dihydro-d-isolysergyl(I) glycinamide. The fine needles melt at 225° C. (corr.) and are easily soluble in alcohol, moderately soluble in chloroform or acetone and difficultly soluble in benzene.

$[a]^{20} = +16°$ ($c=0.3$ in pyridine).
    Calculated      C 66.22  H 6.81  N 17.17%
    Found           C 66.32  H 7.16  N 17.07%
$[a]_D^{20} = +16°$ ($c=0.3$ in pyridine).

Example 8.—Dihydro-d-isolysergyl(II) glycinamide

To a solution of 1.0 g. of dihydro-d-isolysergic(II) azide (prepared according to A. Stoll, A. Hofmann, and Th. Petrzilka, Helv. Chim. Acta 29, 635 (1946)) in 120 cc. of ether, a solution of 0.56 g. of glycinamide in 90 cc. of isopropanol is added and the reaction mixture allowed to stand for 12 hours at room temperature. After removal of the solvent under vacuum the residue is chromatographed by using an aluminum oxide column and chloroform containing 4% of alcohol as a solvent. Dihydro-d-isolysergic(II) glycinamide purified in this manner does not crystallize. It is a colorless substance which is easily soluble in alcohol or acetone and difficultly soluble in chloroform or benzene.

Empirical formula $C_{18}H_{22}O_2N_4$:
Yield: 0.90 g. M. P. 140–150° (corr.).

Calculated    C 66.22    H 6.81    N 17.17%
Found         C 66.12    H 7.09    N 17.19%

$[\alpha]_D^{20} = +41°$ ($c = 0.3$ in pyridine).

Example 9.—Dihydro-d-isolysergyl(I) glycin ethyl ester

To a solution of 1.0 g. of dihydro-d-isolysergic(I) azide in 150 cc. of ether, there is added a solution of 0.53 g. of glycine ethyl ester in 50 cc. of ether and the reaction mixture allowed to stand overnight at room temperature.

After removal of the solvent under vacuum the residue is chromatographed by using an aluminum oxide column and chloroform as a solvent. The product purified in this manner crystallizes easily from methanol, ether or acetic ester. Yield: 0.96 g. of dihydro-d-isolysergyl(I) glycine ethyl ester. The long beautiful prisms which are obtained by crystallizing from ether melt at 92° C. (corr.)

Empirical formula $C_{20}H_{25}O_3N_3$:

Calculated    C 67.58    H 7.09    N 11.82%
Found         C 67.57    H 7.30    N 11.80%

$[\alpha]_D^{20} = +23°$ ($c = 0.4$ in pyridine).

Example 10. — Dihydro-d-isolysergyl(II) glycine ethyl ester

To a solution of 1.0 g. dihydro-d-isolysergic(II) azide in 120 cc. of ether, a solution of 0.53 g. of glycine ethyl ester in 50 cc. of ether is added and the reaction mixture allowed to stand for 12 hours at 20° C.

After removal of the solvent under vacuum the residue is chromatographed by using a column of aluminum oxide and chloroform as a solvent. Dihydro-d-isolysergyl(II) glycine ethyl ester purified in this manner can be crystallized from alcohol or acetone. It is easily soluble in these solvents, moderately soluble in benzene and difficulty soluble in ether. The lancet-like leaflets melt at 175° C. (corr.) Yield: 0.85 g.

Empirical formula $C_{20}H_{25}O_3N_3$:

Calculated    C 67.58    H 7.09    N 11.82%
Found         C 67.89    H 7.56    N 11.98%

$[\alpha]_D^{20} = +34°$ ($c = 0.4$ in pyridine).

What we claim is:

1. A compound of the formula $R.CO.NH.R_1$ wherein R.CO. stands for a radical of an acid selected from the group consisting of lysergic and dihydrolysergic acids and their iso forms, and $-NH.R_1$ stands for a member selected from the group consisting of the radicals of glycine, glycinamide and glycine lower alkyl esters.
2. Dihydro-d-lysergyl-glycinamide.
3. Dihydro-d-lysergyl-glycine ethyl ester.
4. Dihydro-d-isolysergyl(I)-glycinamide.
5. Dihydro-d-isolysergyl(I)-glycine ethyl ester.
6. d-Lysergyl-glycinamide.

ARTHUR STOLL.
ALBERT HOFMANN.
ERNEST JUCKER.
THEODOR PETRZILKA.
JÜRG RUTSCHMANN.
FRANZ TROXLER.

REFERENCES CITED

The following references are of record in the files of this patent:

UNITED STATES PATENTS

| Number | Name | Date |
|---|---|---|
| 2,090,429 | Stoll et al. | Aug. 17, 1937 |
| 2,090,430 | Stoll et al. | Aug. 17, 1937 |
| 2,359,688 | Stoll et al. | Oct. 3, 1944 |

OTHER REFERENCES

Stoll et al., Helv. Chim. Acta., vol. 26, pp. 1602–1613 (1943).

Jacobs et al., J. Biol. Chem., vol. 110, pp. 521–530 (1935).